United States Patent
Stopler et al.

(10) Patent No.: US 10,498,486 B1
(45) Date of Patent: Dec. 3, 2019

(54) MAXIMUM A POSTERIORI ITERATIVE DEMAPPER FOR MULTI ANTENNA COMMUNICATION SYSTEM

(71) Applicant: Avago Technologies General IP (Singapore) Pte. Ltd., Singapore (SG)

(72) Inventors: Daniel Stopler, Tel Aviv (IL); Rethnakaran Pulikkoonattu, San Diego, CA (US); Roy Oren, Tel Aviv (IL); Ilan Reuven, Tel Aviv (IL); Amir Eliaz, Tel Aviv (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/111,114

(22) Filed: Aug. 23, 2018

(51) Int. Cl.
*H04L 1/00* (2006.01)

(52) U.S. Cl.
CPC .................. *H04L 1/0054* (2013.01)

(58) Field of Classification Search
CPC .................................................. H04L 1/0054
USPC ......................................................... 375/341
See application file for complete search history.

(56) References Cited

U.S. PATENT DOCUMENTS

| | | | |
|---|---|---|---|
| 8,503,552 B2 * | 8/2013 | Pfletschinger | H04L 27/38 330/107 |
| 8,855,221 B2 * | 10/2014 | Papadopoulos | H04L 27/2647 375/259 |
| 9,191,256 B2 * | 11/2015 | Vojcic | H04L 1/005 |
| 2003/0235149 A1 * | 12/2003 | Chan | H04L 1/005 370/206 |
| 2006/0215781 A1 * | 9/2006 | Lee | H04L 1/0656 375/267 |
| 2007/0036245 A1 * | 2/2007 | Hammerschmidt | H04B 1/406 375/340 |
| 2007/0041475 A1 * | 2/2007 | Koshy | H04L 1/0048 375/340 |
| 2008/0285671 A1 * | 11/2008 | Sundberg | H03M 13/3905 375/260 |
| 2009/0304114 A1 * | 12/2009 | Burg | H04L 1/0052 375/340 |

* cited by examiner

*Primary Examiner* — Juan A Torres
(74) *Attorney, Agent, or Firm* — Morgan, Lewis & Bockius LLP

(57) ABSTRACT

An apparatus includes a demapper to compute a reliability metric associated with a number of bit streams received by multiple radio-frequency (RF) antennas. The apparatus further includes a channel decoder in a feedback loop with the demapper to process the reliability metric and to provide a feedback signal to the demapper. The demapper is an iterative demapper and can use a symbol subset of at least a first stream of the plurality of bit streams and the feedback signal to compute the reliability metric for a second stream of the plurality of bit streams.

20 Claims, 11 Drawing Sheets

MAXIMUM A POSTERIORI ITERATIVE DEMAPPER FOR MULTI ANTENNA COMMUNICATION SYSTEM

TECHNICAL FIELD

The present description relates generally to wireless communications, and more particularly, to a reduced complexity soft demapper for a multi antenna communication system.

BACKGROUND

Wireless communication systems use various modulation schemes to modulate signals. For example, a modulation symbol map may be used to generate a modulated signal based on a quadrature amplitude modulation (QAM) scheme such as one of QPSK,16QAM, 64QAM . . . 1024QAM or higher order QAM schemes. The modulated signal is transmitted through a communication channel characterized by a channel matrix, and is affected by interfering signals. At a wireless receiver end, the modulated signal is detected using a modulation symbol demapper and a channel decoder. The modulation symbol demapper can estimate the constellation symbols of a constellation (e.g., a QAM constellation), from a noisy received signal. The demapper also computes a reliability measure for every bit in the bit streams. The symbol demapper can use a maximum likelihood (ML) or maximum a posteriori algorithm or an iterative ML (iML) algorithm to compute a log likelihood ratio (LLR) for each bit of the bit stream.

There are a number of ways to implement the iML demapper with various degrees of computational complexities. For example, in a brute force approach the computational complexity of the iML is of the order of $N^2*2*\log(N)$, where N is the constellation order or size indicating a total number of constellation points of the employed modulation scheme (e.g., a QAM) for a two stream MIMO system. A better known solution for multiple-input multiple-output (MIMO) ML decoding (e.g., a none iterative decoding case) reduces the order of computational complexity to $N*2*\log(N)$, for a two stream MIMO detector. In this approach desired signal constellation (i.e. O(N) points) is scanned, and for each desired stream constellation point, a most likely interferer point is computed (e.g., by equalization and slicing) and LLR per bit for the desired stream is updated (e.g., O(log(N))). However, the solution requires sweeping for both streams (e.g., desired and interference), thus the overall complexity can be $0(N*2*\log(N))$. A better yet known approach, is to reduce search for streams i=1 and i=2, by using spheres (e.g., sphere size <N). Because streams i=1 and i=2, have different signal-to-noise (SNR), the sphere sizes are also different. In particular, the stream having a low SNR would require a large sphere and would dominate the computational complexity, which is given by $O((S1+S2)*\log(N))$, where without loss of generality, S1 and S2 are the sphere sizes for weak stream and strong stream, respectively, and S2<S1. An iML demapping approach with even lower complexity is desired.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

Figure 1A:
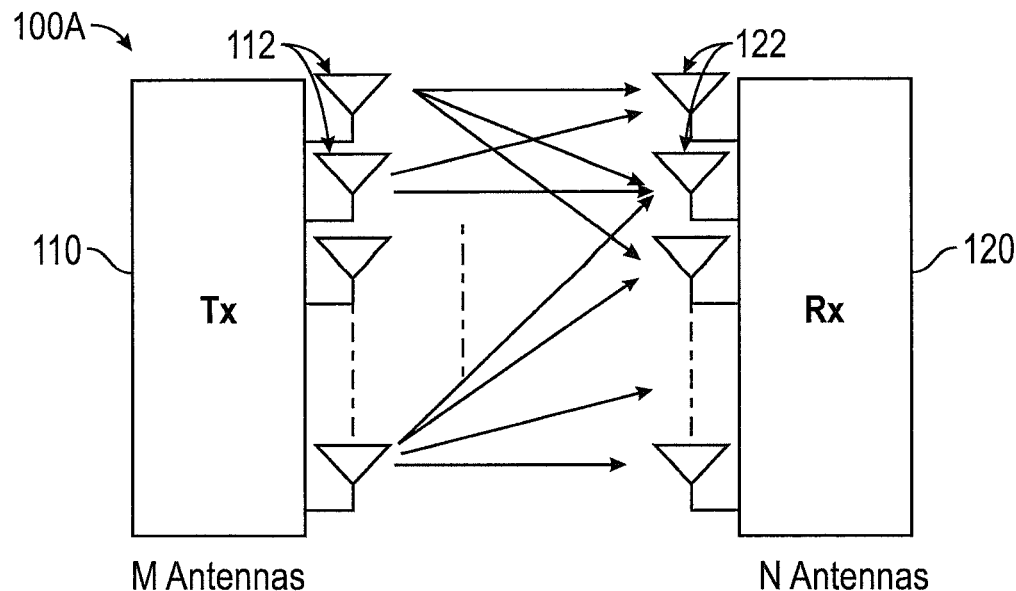
FIGS. 1A-1B are high-level block diagrams illustrating examples of a Multi-input multi-output (MIMO) transceiver and a system model of a soft demodulator of a MIMO receiver, according to aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects of the subject technology, systems and configurations are described for a multi-stream demapper. The disclosed approach uses maximum likelihood (ML) criteria based symbol detection, with manageable computational complexity. The symbol detection approach of the subject technology is based on an approximate ML criterion, to achieve a receiver with candidate scanning to realize significant savings in computations, power and processing time. Different information processing strategy can be applied to reliability detect the bit stream in each stage of an iterative receiver. In one or more implementation, a reduced set candidate identification, generation and search strategy can be used to achieve near ML like performance for the first iteration. Later iterations can be based on a different strategy to identify the appropriate list of bits, only whose LLR are to be searched, thereby lowering search efforts in arriving at the reliable bit LLRs. After the first iteration, the disclosed scheme comes close to the optimum MAP based schemes, with a several fold less computational, power and latency burden, and the computation complexity remains near constant, even with modulation size scaling.

The subject technology can support dual stream multiple-input multiple-output (MIMO) communications, for instance, two spatial streams including 4×2, 2×2 and 8×2 MIMO communication systems, where in the notation $N_T \times N_R$, $N_T$ stands for the number of transmit chains (antennas) and $N_R$ represents the total number of receive chains (antennas). The disclosed demapper can work with or without transmit precoding and or beamforming, and with different precoding schemes such as singular value decomposition (SVD), ML, fixed angle and other precoding schemes. Modulation schemes supported by the 802.11a/b/g/n/ah/af/ad/ay/ac/ax and Gray mapped QAM modulation alphabets, over and beyond specified in the 802.11 standards specifications are fully supported by the disclosed solution. For example, the demapper of the subject technology can work with 4096 QAM, and can support dual stream MIMO-orthogonal frequency division multiplexing (OFDM) communication transmission schemes. Further, link performance is not compromised, in comparison with a true full maximum a posteriori (MAP) algorithm.

The multi stream demapper of the subject technology includes a number of advantageous features including low computational complexity and implementation friendly scheme, which stay manageable even in applications with larger modulation orders (e.g., up to 4096). Further, the disclosed demapper can support standard and non-standard MIMO communications, and improves wireless communication link performance without compromising hardware, latency and power consumption.

The multi stream demapper of the subject technology can use a symbol subset of a first stream (e.g., a strong interference or an interfering stream, depending on the usage scenario) and a symbol subset of a second stream to derive bit likelihood values for the second stream (e.g., a desired weaker or the desired and the interfered stream, depending on the usage scenario). In some implementations, a subset of or an entire constellation point of the second stream are selected. The multi stream demapper of the subject technology can use the symbol subset of the first stream to derive bit likelihood values associated with the second stream. In some implementations, a bit likelihood contribution is generated based on an equalized signals per candidate symbols of a subset of the first stream. The bit likelihood value can be generated using a number of bit likelihood contributions, which can be determined by a contribution of a number of symbol grid points.

In one or more implementations, the bit likelihood contribution is generated based on a lookup table using equalized signals per candidate symbols of a subset of the first stream. The look-up table can account for probability contribution of a number of symbol grid points. In some implementations, the subset symbol can be represented in a spherical, rectangular or other coordinates. In one or more implementations, the subset dimension can be less than the number of streams, the symbol grid points can be a lattice, and a selected second stream symbol is based on slicing symbol grid to the nearest symbol grid point.

In some implementations, the subset of the second stream is equal or less than $1+\log_2(N)$ and greater than one, where N is a quadrature amplitude modulation (QAM) size, for example, for a 1024-QAM, N can be 1024. In some aspects, the subset parameter of the first stream is selected based on the assumption that the second stream is noise. The subset parameter can be coordinates of a center point of the subset of the first stream. In one or more implementations, the subset parameter is a measure of distance, covering the subset geometry. For example, the subset parameter can be a center of the subset based on maximum-ratio combining (MRC).

In some implementations, the multi stream demapper of the subject technology can scale a triangular decomposition matrix (representing the equivalent channel between the transmitter and receiver) such that one of the main diagonal terms is real constant and some of the the other terms are real. The disclosed multi stream demapper can use a lookup table to hold data, when computing a quality value for stream bits. In one or more implementations, a single lookup table can support one or more symbol maps. The data held by the lookup table can be a likelihood, a measure of distance or coordinates of symbol grid points.

In some implementations, a set of schemes are employed to exploit additional reliability information, by taping a forward error correction decode processing unit, such as a low-density parity-check (LDPC) or a binary convolutional code (BCC) to further improve the communication symbol detection performance. For example, the multi-stream demapper of the subject technology is a maximum a posteriori decision iterative demapper (hereinafter, "a posteriori iterative demapper"). The disclosed a posteriori iterative demapper can derive bit likelihood of a first "desired" stream, based on feedback from a decoder (e.g., a forward error correction (FEC) decoder) of a second "interfering" stream, excluding FEC decoder feedback of the first stream. The a posteriori iterative demapper of the subject technology can use an a posteriori metric produced by the decoder or a decoding process of the second stream, and can select symbol subsets based on the a posteriori metric. The disclosed a posteriori iterative demapper can use a single look-up table to hold data used for computing quality values for stream bits. The data can represent a likelihood, a measure of distance and/or symbol grid point, and the single look-up table can support one or more symbol maps.

The methods and configurations of the subject technology can be applied to various communication systems, for example, a multiple-input multiple-output (MIMO) communication system using a modulation scheme (digital constellation mapping) such as QAM of various modulation orders, N (e.g., up to 4096).

Figure 1B:
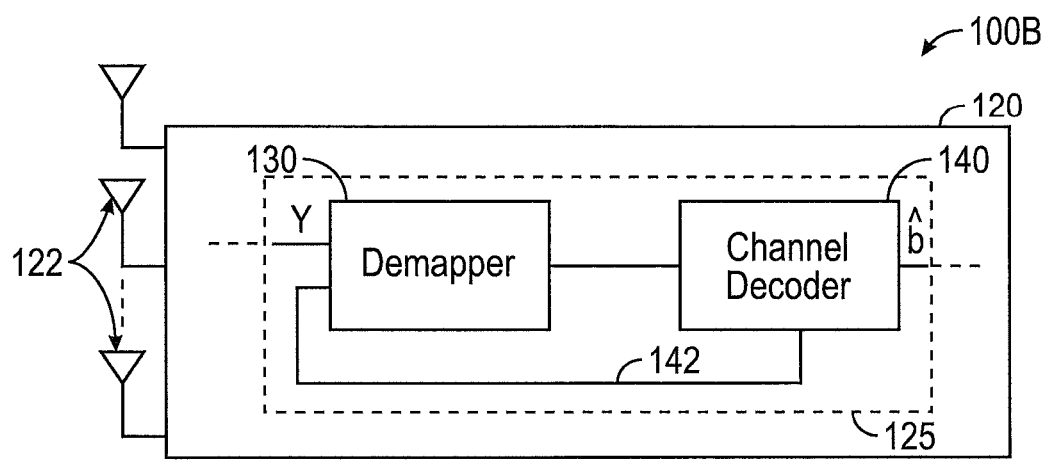

FIGS. 1A-1B are high-level block diagrams illustrating examples of a Multi-input multi-output (MIMO) transceiver 100A and a system model 100B of a soft demodulator of a MIMO receiver 120, according to aspects of the subject technology. The MIMO transceiver is used in many RF and wireless communication technologies including Wi-Fi, long-term evolution (LTE) and other communication technologies. The MIMO transceiver 100A includes a multi-antenna transmitter 110 and multi-antenna receiver 120. The multi-antenna transmitter 110 includes $N_T$ transmit (TX) antennas 112 and the multi-antenna receiver 120 includes $N_R$ receive (RX) antennas 122. Each RX antenna 122 may receive RX signals over different paths (links) from to a number of TX antennas 112. The additional RX signal can be used to advantage, as they can be used to provide additional robustness to the radio link by improving the signal-to-noise ratio (SNR), or by increasing the link data throughput capacity. The number of spatial streams $N_S$ communicated between the multi-antenna transmitter 110 and multi-antenna receiver 120 is smaller than the smallest of $N_T$ and $N_R$.

The system model 100B shown in FIG. 1B depicts a system model of a soft demodulator 125 of the multi-antenna receiver 120. The receiver 120 includes a number of other RF and baseband components and modules, which are not shown in FIG. 1B for simplicity. In a MIMO receiver, the data rate can increase, for example, linearly with the number of antennas. The MIMO receiver, however, has to effectively handle the interference among the multiple spatial streams. The soft demodulator 125 can use an equalizer output or operate as a MIMO maximum likelihood (ML) soft demodulator, as described in more detail herein. The soft demodulator 125 includes a demapper 130 and a channel decoder 140. The demapper 130 is responsible for determining the combination of bits in a bit stream of a transmitted signal (Y), after extraction of phase and modulation of the signal by other components and module of the receiver 120. The demapper 130 can be soft demapper that can derive for each bit of the bit stream likelihoods of the bit being a 0 or a 1. The decoder 140 can decode data in the remapped stream, which has been encoded with an error correcting code. The decoder 140 can be soft input/soft output decoder that accepts likelihood values at its input, as opposed to a hard decoder that can accept only 0 or 1 as the decoder input, and provides soft bit LLRs as opposed to a decoder that generates hard 0/1 bit decisions.

In some implementations, the demapper 130 can be used, for example, to implement a reduced complexity ML demodulation scheme of the subject technology. For example, the demapper 130 can compute an LLR associated with each bit of a bit stream received by the antenna 122, as discussed in more detail herein. The demapper 130 can use a symbol subset of at least a first stream to compute the LLR for a second stream. In some implementations, the first and second streams include an interfering bit stream (e.g., interference) and a desired stream, the stream for which bit LLRs are calculated in the current calculation cycle. The demapper 130 can support QAM modulation.

In one or more implementations, a the demapper 130 may use a feedback signal 142 from the channel decoder 140, for example, including extrinsic bit LLRs, to implement a reduced complexity a posteriori iterative ML (iML) demapping scheme of the of the subject technology. The demapper 130, for example, can use a symbol subset of at least the first stream of a number of bit streams and the feedback signal 142 provided by the decoder 140 to compute the reliability metric (LLR) for a second stream. The feedback signal 142 includes a priori bit probabilities associated with the interfering stream (from which both extrinsic and intrinsic LLR's can be derived). For each iteration, the feedback signal 142 is derived from a decoder output at a previous iteration. An output of the decoder is b, which is a better estimate of a given bit b than that extracted without the feedback from the channel decoder.

Figure 2:
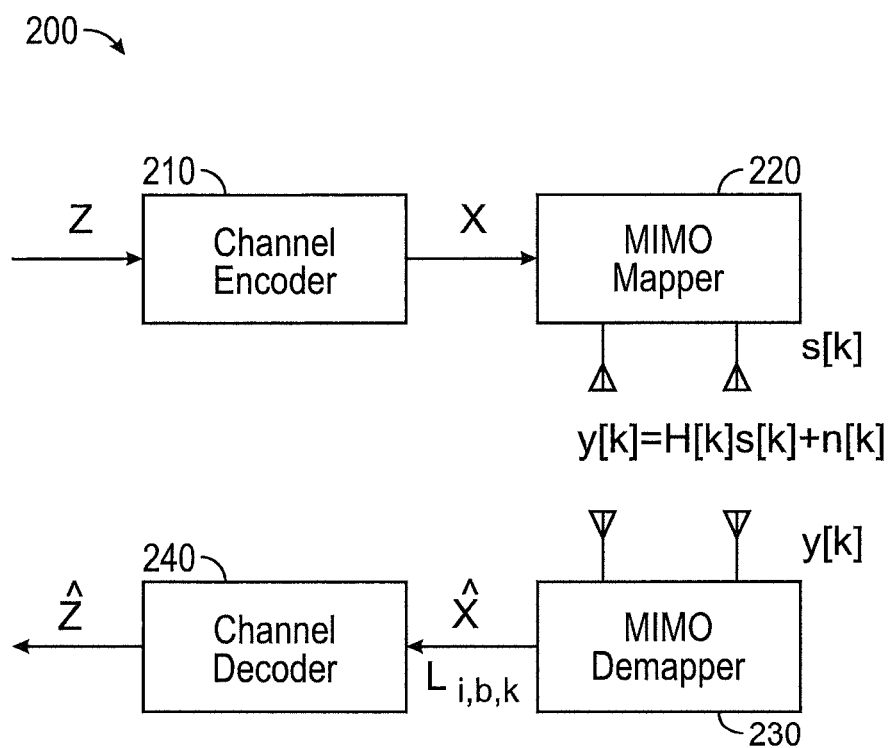
FIG. 2 is a high-level block diagram illustrating an example of a system model of a MIMO receiver.

FIG. 2 is a high-level block diagram illustrating an example of a system model 200 of a MIMO receiver. The system model 200 is an abstract baseband equivalent, frequency domain representation corresponding to a wireless communication system such as a MIMO transceiver of FIG. 1A. A bit stream Z, after performing the channel encoding (e.g., LDPC) by a channel encoder 210, passes through a stream parser, followed by constellation mapping (e.g., QAM). The stream parser splits the bit stream into multiple separate spatial streams, for example, one spatial stream for each of the MIMO transmit chain. The block MIMO mapper 220 includes both the stream parser, parallel QAM mapping units and precoding (spatial mapping)—mapping of the multiple spatial streams to transmit chains. The number of transmit chains can be equal to or larger than the number of spatial streams. Output of the MIMO mapper is a $N_T \times 1$ vector $S=[S1\ S2\ \ldots\ S_{NT}]^T$, whose elements S[k] at a given subcarrier index k are signals drawn from an appropriate QAM alphabet, based on the chosen modulation and coding scheme (MCS) or a linear combination of QAM signal points as dictated by the spatial mapping matrix (precoding). The signal S goes through a channel (H, n) and reaches the receiver as a signal represented as Y. The fading (or attenuation) part of the channel model is represented by H, and the noise n is typically, but not necessarily, modeled as a zero-mean complex Gaussian white or colored random process, i.e., $n \sim CN(0, \sigma^2)$ is the proper complex additive white Gaussian noise (CAWGN). At the receiver, the main functional units are a MIMO demapper 230 (also known to as MIMO detector) and a channel decoder 240 (e.g., LDPC). The MIMO demapper 230 and the channel decoder 240 operate rather independently in the case of a non-iterative receiver. In the case of an iterative receiver, the MIMO demapper 230 can compute a reliability metric such as log likelihood ratio (LLR), which is exploited by the channel decoder 240 to arrive at a better estimate $\hat{b}$ of a given bit b.

Figure 3A:
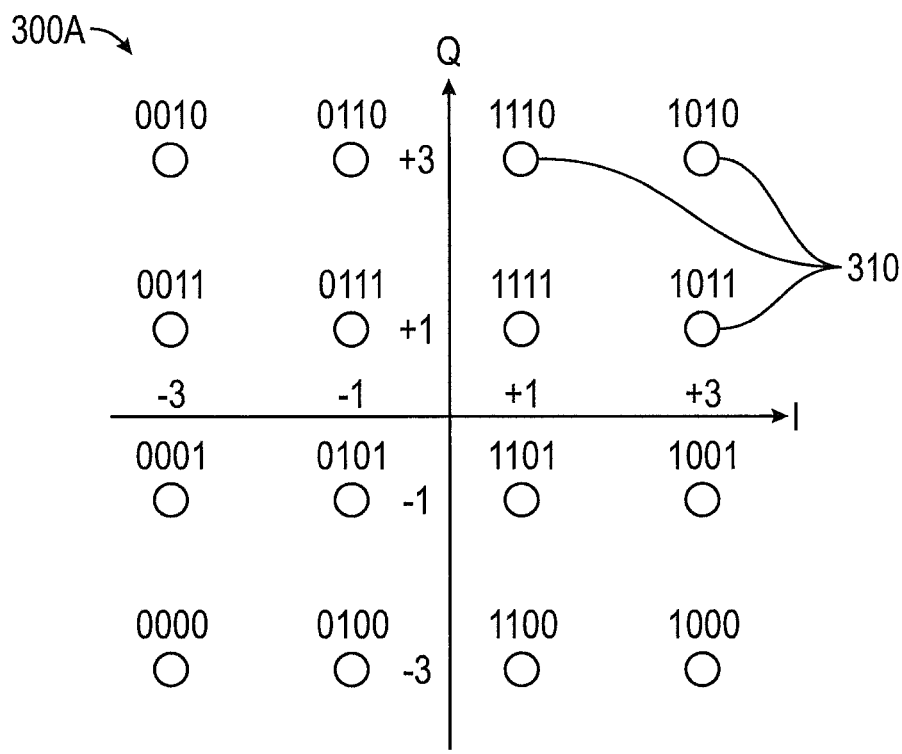
FIGS. 3A-3B are diagrams illustrating examples of constellations of a quadrature amplitude modulation (QAM) signal with different modulation orders, according to aspects of the subject technology.
Figure 3B:
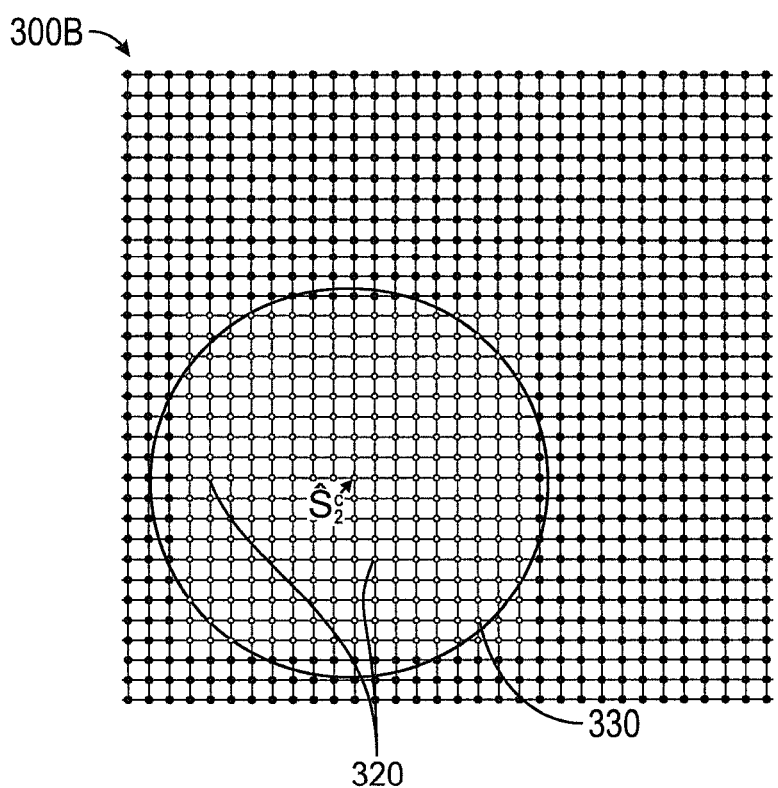

FIGS. 3A-3B are diagrams illustrating examples of constellations 300A and 300B of a QAM signal with different modulation orders. The constellations 300A is a representation of a signal modulated by a QAM modulation scheme displayed as a two-dimensional complex I-Q grid. The constellations 300A displays a QAM with a modulation order of 16 (e.g., 16-QAM), which includes 16 constellation points 310, each being represented by a four bit $(b_0 b_1 b_2 b_3)$ symbol. The number of constellation points (N), also referred to as the size of the alphabet of symbols that can be transmitted by each sample, is equal to the modulation order. In general, a modulation scheme with N constellation points can transmit $\log_2 N$ bits per sample. For example, for the 16-QAM constellation, each constellation point (e.g., symbol) has $\log_2 16 = 4$ bits. After passing through the communication channel the signal is decoded by a demodulator (e.g., 125 of FIG. 1). The function of the demodulator is to classify each sample as a symbol. The sample values that the demodulator classifies as a given symbol can be represented by a region in the I-Q constellation grid drawn around each constellation point. The noise may cause the point representing a sample to stray into the region representing another symbol. This can cause the demodulator to misidentify that sample as the other symbol, resulting in a symbol error. To address this problem, in a demapping mode referred to as the maximum likelihood (ML) demapping, the demapper can choose, as an estimate of the actually transmitted signal (e.g., S(K) of FIG. 2), the constellation point that is closest (e.g., in an Euclidean distance sense) to the received sample (e.g., Y(K) of FIG. 2).

The constellations 300B shown in FIG. 3B is associated with a larger modulation order (N) QAM, for example, a 1024-QAM that can be handled by the demapping schemes of the subject technology. In the reduced complexity ML and iML schemes of the subject technology at least part of the computations performed by the demapper (e.g., 130 of FIG. 1A) is over a portion of the entire constellation 300B, for example, over a reduced number of constellation points 320, inside a circle (referred to as sphere) 330.

In one or more aspects, the system of FIG. 2 can be modeled with simpler equation based on a two spatial streams as follows:

$$\begin{bmatrix} Y_1 \\ Y_2 \end{bmatrix} = \begin{bmatrix} R_{1,1} & R_{1,2} \\ R_{2,1} & R_{2,2} \end{bmatrix} * \begin{bmatrix} X_1 \\ X_2 \end{bmatrix} + \begin{bmatrix} n_1 \\ n_2 \end{bmatrix} \quad \text{(Eq. 1)}$$

Where, $Y_1$ and $Y_2$ are signals received at the demodulator (e.g., 125 of FIG. 1B), also referred to observations, $X_1$ and $X_2$ represent demapper outputs (bit streams) and the channel matrix R:

$$R = \begin{pmatrix} R_{1,1} & R_{1,2} \\ R_{2,1} & R_{2,2} \end{pmatrix} \quad \text{(Eq. 2)}$$

represents the composite channel response (transfer function) from transmitted streams to received signals. In the present disclosure, for the purpose of reducing the complexity, the streams $X_1$ and $X_2$ are considered as desired and interference streams. In the iterative ML demapping case, in iterations using FEC decoder extrinsic information, the stream for which a posteriori LLR's is computed is viewed as desired, and the stream from which extrinsic LLR's is used is viewed as interfering (subsequently alternating between the streams to compute a posteriori LLR's for both). In contrast in non-iterative ML Demapping (and the first iteration of the iterative ML demapping) X1 is selected to be the weak (lower SNR) stream and X2 to be the strong (higher SNR) stream. This would imply: $(|R_{1,1}|^2 + |R_{2,1}|^2) < (|R_{1,2}|^2 + |R_{2,2}|^2)$, which allows what is called upper triangulation, in which $R_{2,1}$ is set to zero. In the disclosed reduced complexity ML and a posteriori iML (only first iteration) schemes, the demapper sweeps for the strong stream $X_2$ over the constellation points 320 inside the sphere 330 instead of the entire constellation points of the constellation 300B, this can significantly simplify computations. In contrast, it is understood that prior methods using a sphere for the stream having a low SNR (e.g., the weak stream) would have required a large sphere and would have dominated the computational complexity, which would have been given by $O((S_1+S_2)*\log(N))$, where without loss of generality, N is the constellation size and S1 and S2 are the sphere sizes for weak stream $X_1$ and the strong stream $X_2$, respectively, and S2<S1. The demapper then computes the constellation points of the weak stream $X_1$ based on $X_2$ values, as discussed herein using lookup tables. The process of generating candidate pairs $(X_1, X_2)$ in one of the embodiments of the present invention is based on a single sweep, i.e., some region (e.g., sphere) of the constellation is taken as candidates for one stream and mates from the other stream are paired to each one signal points in this region. Thus, in order to reduce the computational burden, the strong stream is selected to be the one which the search is centered around as in this case the sphere (the region swept) is smaller. The coordinates $X_{center}$ of the sphere 330 can be expressed as:

$$X_{center} = \alpha \cdot \frac{y_1 \cdot R_{1,2}^*}{|R_{1,2}|^2} + (1-\alpha) \cdot \frac{y_2 \cdot R_{2,2}^*}{|R_{2,2}|^2} \quad \text{(Eq. 3)}$$

Where $y_1$ and $y_2$ are values of the signals $Y_1$ and $Y_2$ of Eq. 1, $R_{1,2}$ and $R_{2,2}$ are elements of the channel characteristics matrix of Eq. 2, and a is a real-valued weight factor which takes on a value in the range [0,1] that can be expressed as:

$$\alpha = \frac{1}{1 + \left(1 + K_{QAM}^2 |R_{1,1}|^2 \frac{|R_{2,2}|^2}{|R_{1,2}|^2}\right)} \quad \text{(Eq. 4)}$$

Where, $K_{QAM}^2 = 1$, for QAM order N=2 (BPSK) and for higher order $$QAMs(N>2), K_{QAM}^2 = \frac{2}{3}(N-1).$$

This selection of the center reflects an MRC combination of the two received signals when the contribution of the first stream to the received signal as noise.

Figure 4:
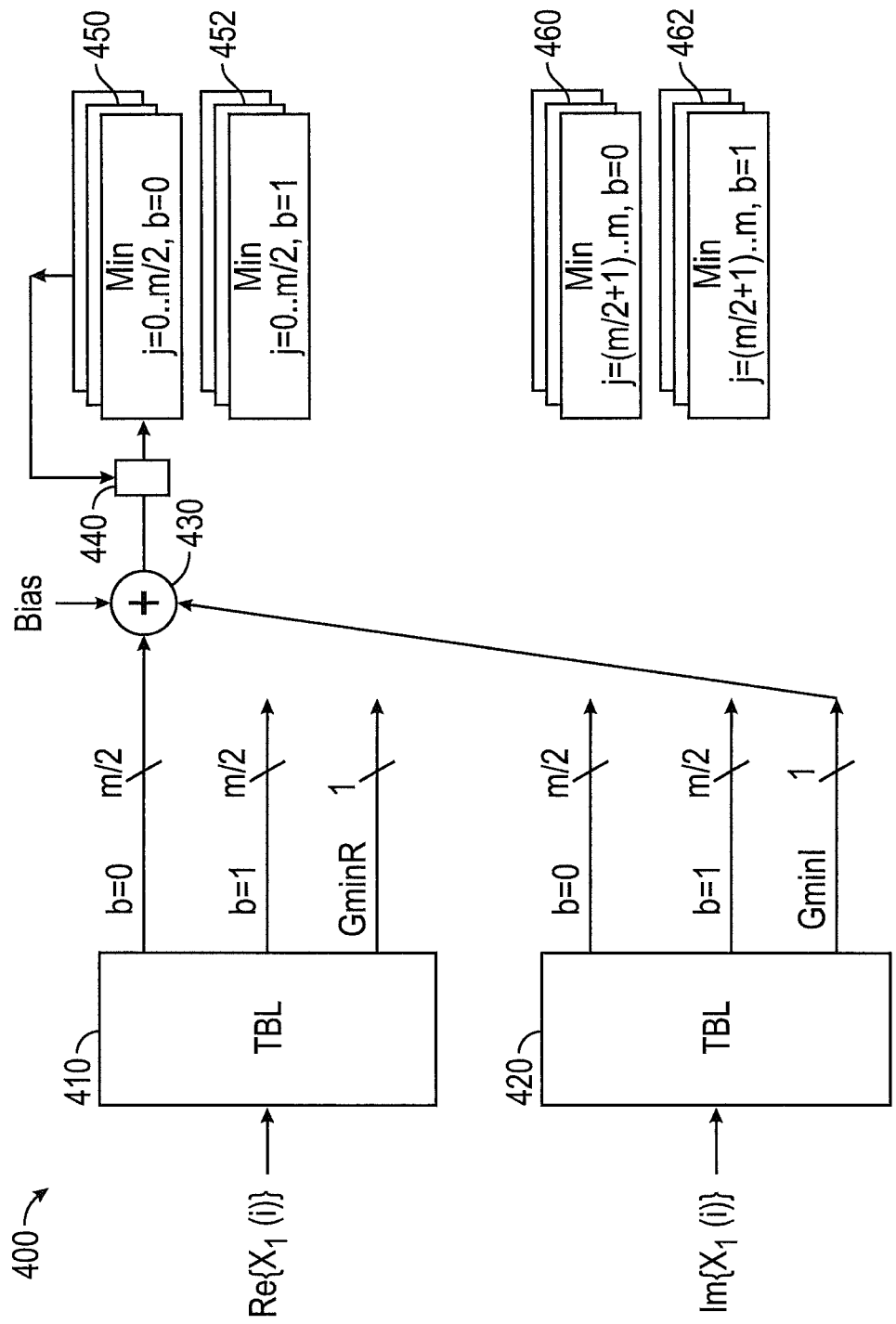
FIG. 4 is a high-level diagram illustrating an example algorithm for weak stream log likelihood updating, according to aspects of the subject technology.

FIG. 4 is a high-level diagram illustrating an example algorithm 400 for weak stream log likelihood updating, according to aspects of the subject technology. As described above, the subject solution reduces complexity of the ML and a posteriori iML schemes by only sweeping values of the strong stream $X_2$ over a portion of the constellation points encompassed by the sphere 330 of FIG. 3, which is the smaller sphere, and using lookup tables for the weak stream $X_1$ values. The use of lookup tables for the weak stream $X_1$ covers the entire weak stream constellation at a low overall complexity, given by $O(S2*\log(N))$, where S2 is the size of the smaller sphere and N the size of the constellation. The complex values of the weak stream $X_1$ constellation points are given in terms of values of strong stream $X_2$ constellation points as:

$$X_1 = \left[\frac{Y_1 - R_{12} \cdot X_2}{R_{11}}\right] \quad \text{(Eq. 5)}$$

Where, $Y_1, X_2, R_{11}$ and $R_{12}$ are as defined with respect to Eq. 2 above. The subject solution calculates log likelihood (LL) values using tables 410 and 420. The tables 410 and 420 are, respectively, for real and imaginary values of the weak stream $X_1$ that are obtained from the Eq. 5 above. This separation for the real and imaginary values of the weak stream $X_1$ is based on the fact that constellation values are modulated based on real (I) and imaginary (Q) axes of a constellation grid. For example, the bits $b_0 b_1 b_2 b_3$ of 16-QAM constellation points of the constellation 300A of FIG. 3A are modulated as follows. The bits $b_0 b_1$ are modulated using the real (I) axis and the bits $b_2 b_3$ are modulated using the imaginary (Q) axis. Accordingly, table 410 handles the real (I) axis and derives a first half of the bits (0 . . . (m/2–1), e.g., $b_0 b_1$), and table 420 handles the imaginary (Q) axis and derives the other half of the bits (m/2 . . . (m–1), e.g., $b_2 b_3$), where m is the number of bits (e.g., m=4 for 16-QAM) of each symbol.

The output of the tables 410 and 420 include LL values for b=0 and b=1 and a complex $G_{min}$ value (e.g., real $G_{minR}$ value for table 410 and an imaginary $G_{minI}$ value for tables 420). The $G_{min}$ value represents a distance between a calculated $X_1$ values and a corresponding actual constellation point. For example, a $G_{min}=0$ indicates an $X_1$ value that matches a value of a point on the constellation grid (e.g., as shown in FIG. 3B), and $G_{min} \neq 0$ is an indication that $X_1$ value does not match any value of a point on the constellation grid. For instance, for 16-QAM, a value of $X_1$ can be $X_1 = 1.4*j-1.4$, which is a point near the center of the top left quadrant. Each of the tables 410 and 420 has m/2 (=2) outputs for b=0 and m/2 (=2) outputs for b=1, the total of 4 outputs. Each output is a log likelihood (LL), which for Gaussian noise is a Euclidean distance. For the bit mapping of FIG. 3A, the first output is for $b_0$ when $b_0=0$, where the closest distance to such a point is $|(1.4*j-1.4)-(1*j-1)|^2 = |0.4*j+0.4|^2 = 0.4^2 + 0.4^2 = 0.16+0.16 = 0.32$. The second output is for $b_1$ when $b_1=0$, where the closest distance to such a point is $|(1.4*j-1.4)-(1*j-3)|^2=|0.4*j+1.6|^2=0.4^2+1.6^2=0.16+2.56=2.76$. The third output is for $b_0$ when $1)_0=1$, where the closest distance to such a point is $|(1.4*j-1.4)-(1*j+1)|^2=|0.4*j-2.4|^2=0.4^2+2.4^2=0.16+5.76=5.92$. The fourth output is for $b_1$ when $b_1=1$, where the closest distance to such a point is $|(1.4*j-1.4)-(1*j-1)|^2=|0.4*j+0.4|^2=0.4^2+0.4^2=0.16+0.16=0.32$.

Note that in all four computations of the four outputs, there is a common element of $0.4^2=0.16$. This common element represent the distance on the imaginary axis, as for all the points the imaginary component was $1*j$. This distance represents a value of the $G_{min}$. Therefore, the table 410 only store the distance on the real axis and then adds $G_{min}$ and the BIAS value (given by Eq. 6 below). Note that the $G_{min}$ added for bits of table 410 equals to the minimal distance in the other axis (imaginary), that is why it is derived from the other table (e.g., 420). Number of registers in each register group (e.g., 450) is equal to $1+m/2=1+\log_2(N)/2$, which for 16-QAM case is $1+\log_2(16)/2=3$. There a total of 4 register groups (branches), two for real section (one for bit value of 1, and one bit for bit value of 0). 2 For imaginary section: one for bit value of 1, and one for bit value of 0. The registers of each register group are updated when a current summation value including a value coming from a respective table (e.g., 410 or 420)+$G_{min}$+BIAS is lower than a previously stored value. The comparison between the current summation value and a previously stored value is performed by the comparison block 440.

The table outputs are summed to a bias value, at a summation point 430, and stored in registers groups 450, 452, 460 and 462, where registers 450, 452 are used for real values and registers groups 460, 462 are used for imaginary values. The bias value is given as:

$$\text{Bias} = \left[\frac{Y_2 - R_{22} \cdot X_2}{R_{11}}\right]^2 \quad \text{(Eq. 6)}$$

Figure 5A:
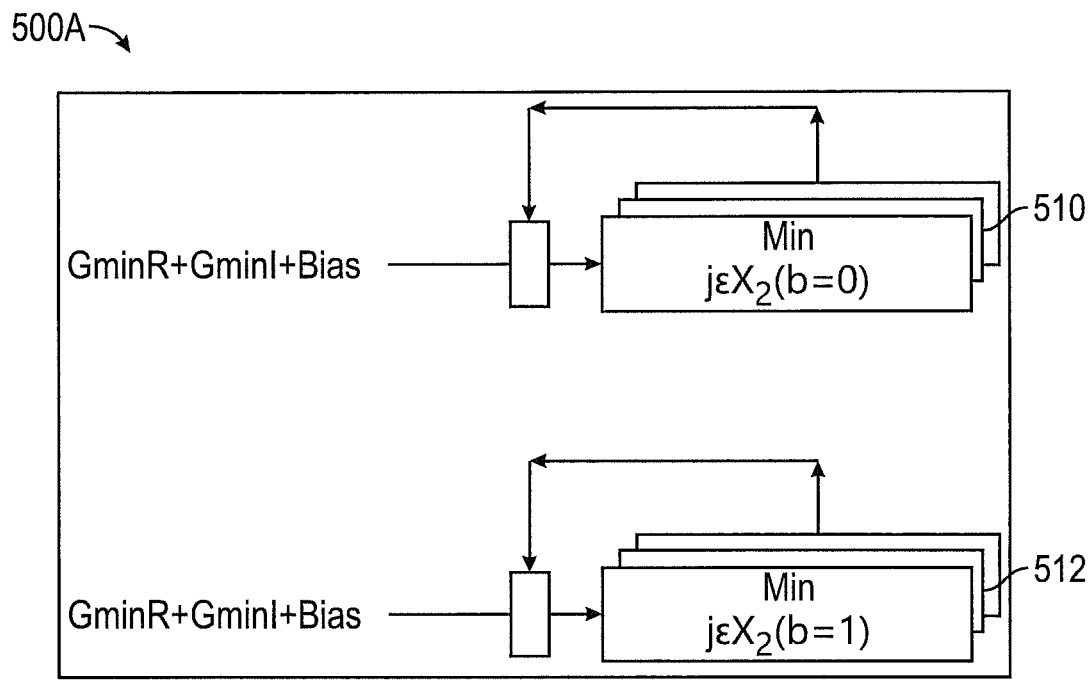
FIGS. 5A-5B are high level diagrams illustrating example algorithms for strong stream log likelihood updating and log likelihood ration (LLR) computation, according to aspects of the subject technology.
Figure 5B:
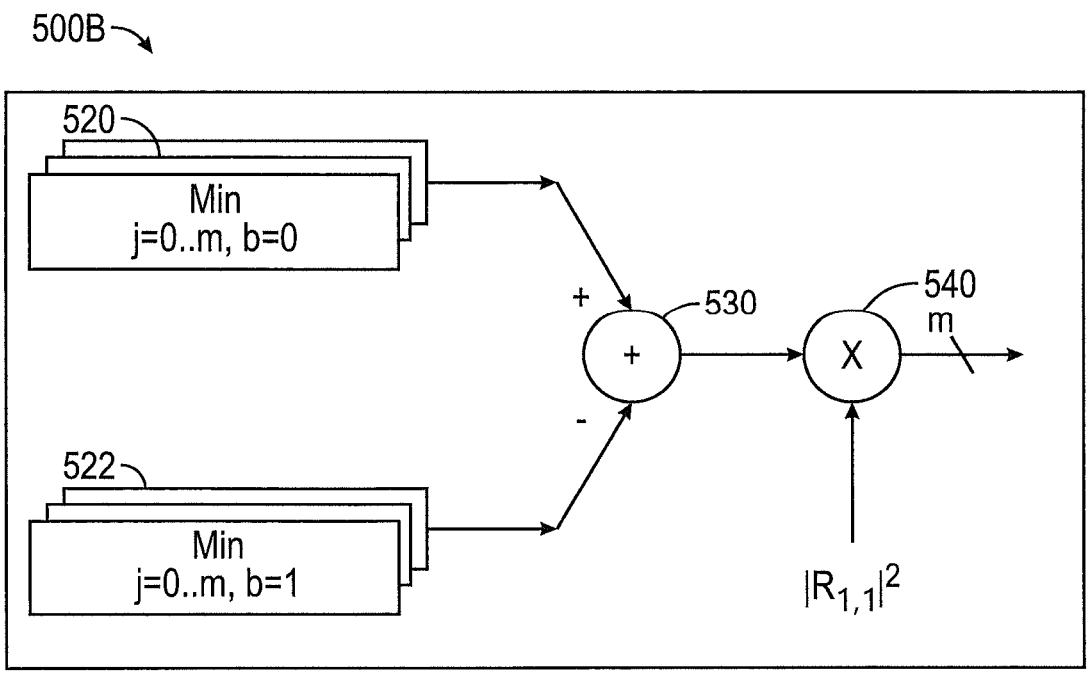

FIGS. 5A-5B are high level diagrams illustrating example algorithms 500A and 500B for strong stream log likelihood updating and log likelihood ratio (LLR) computation, according to aspects of the subject technology. For the strong stream, as discussed above, the constellation point within the sphere 330 of FIG. 3B are swept to obtain $X_2$ values. The LL for each bit of the strong steam is obtained from the expression:

$$LL = G_{minR} + G_{minI} + \text{Bias} \quad \text{(Eq. 7)}$$

Where $G_{minR}$, $G_{minI}$ and Bias are the same as discussed above with respect to FIG. 4. The register groups 510 and 520 store values of LL for all bits having a value of 0 and 1, respectively, for the strong stream.

After the LL values for all bits having a value of 0 (e.g., $LL_{(0)}$) and 1 (e.g., $LL_{(1)}$) are stored in the register groups 510 and 512, the LLR for each bit can be calculated from the expression:

$$LLR = (LL_{(0)} - LL_{(1)})/[R_{1,1}]^2 \quad \text{(Eq. 8)}$$

Where $LL_{(0)}$ and $LL_{(1)}$ are LL values for bits having a value of 0 and 1, respectively, which are stored in register groups 520 and 522. While the register groups 510 and 512 are for the strong stream, the register groups 520 and 522 can be either for the strong or the weak stream. The subtraction of Eq. 8 is implemented by the summation block 530, and the subtraction result is normalized, at the multiplication block 540, by multiplying the result by $1/[R_{1,1}]^2$. For example, for the 4 bits (e.g., m=4) of each symbol of a 16-QAM constellation, four LLR values are calculated.

Figure 6:
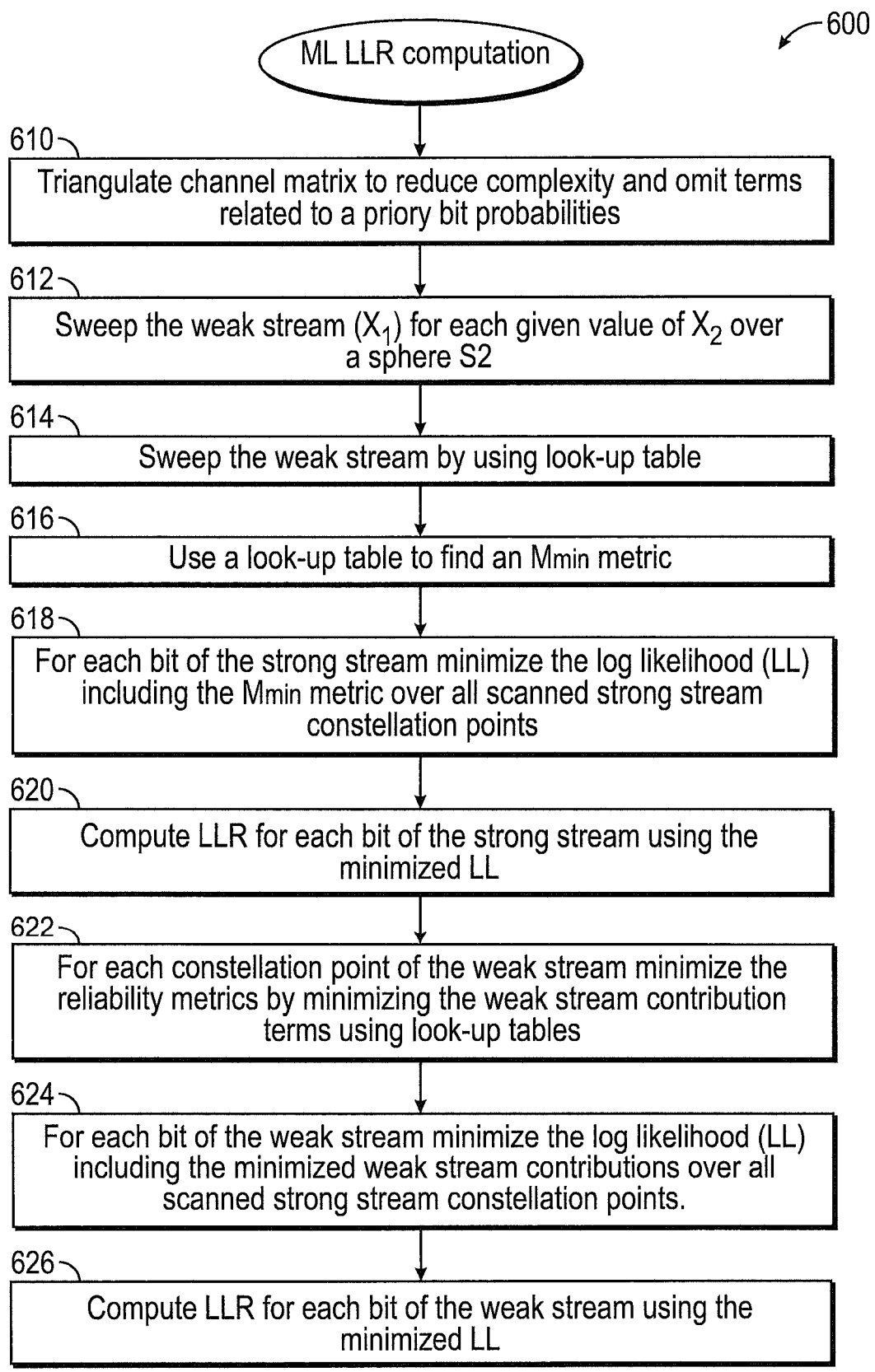
FIG. 6 is a flow diagram illustrating an example process for a reduced complexity maximum likelihood (ML) LLR computation, according to aspects of the subject technology.

FIG. 6 is a flow diagram illustrating an example process 600 for a reduced complexity maximum likelihood (ML) LLR computation, according to aspects of the subject technology. The process 600 will be discussed in more formal way using mathematical equations, when needed, to explain the concepts introduced in the above descriptions with respect to FIGS. 4 and 5A-5B. The process 600 starts at operation block 610, where in order to reduce complexity in the LLR calculation the channel matrix R of Eq. 2, is converted to an equivalent triangular form through a Hermitian transformation. It is noted that the subject solution is also applicable if instead of the channel matrix R, the channel H (e.g., of FIG. 2) is used by applying equalization. Using triangular channel matrix R and dividing and multiplying by $r_{11}$, the likelihood terms for the weak stream (i=1) can be expressed as:

$$L_{1,b}^{(1)} = \min_{s_2 \in S_2} \min_{s_1 \in X_{1,b}^1} \frac{\|r_{11}\|^2}{N_0} \left\| y/r_{11} - \begin{bmatrix} 1 & r_{12}/r_{11} \\ 0 & r_{22}/r_{11} \end{bmatrix} \begin{bmatrix} s_1 \\ s_2 \end{bmatrix} \right\|^2 - \quad \text{(Eq. 9)}$$
$$\log P(s_1) - \log P(s_2)$$

$$L_{1,b}^{(0)} = \min_{s_2 \in S_2} \min_{s_1 \in X_{1,b}^0} \frac{\|r_{11}\|^2}{N_0} \left\| y/r_{11} - \begin{bmatrix} 1 & r_{12}/r_{11} \\ 0 & r_{22}/r_{11} \end{bmatrix} \begin{bmatrix} s_1 \\ s_2 \end{bmatrix} \right\|^2 - \quad \text{(Eq. 10)}$$
$$\log P(s_1) - \log P(s_2)$$

Where, $s_1 \in X_{1,b}^0$, $s_1 \in X_{1,b}^1$ are constellation points of the weak stream (i=1) for bit b value 0 and 1, respectively, $s_2 \in S_2$ are constellation points of strong stream (i=2) for any bit tuple within sphere $S_2$ (the sphere of strong stream). $P(s_1)$, $P(s_2)$ are a priori bit probabilities of the weak and the strong signal, which can be obtained from the decoder from second iterative ML iteration, but are omitted in the ML implementation, as initially are assumed uniformly distributed complexity (610). The process 600 continues with operation block 612 where, as discussed above, the weak stream ($X_1$) is swept for each value of the strong stream (X1) over the constellation points of the smaller sphere (e.g., sphere 330 of FIG. 3). At operation block 614, the weak stream is swept for each given value of the $X_2$ within the sphere, by using look-up tables. The lookup tables used for the weak stream can cover the entire weak stream constellation at low complexity (e.g., of the order of S2 log(N)). To understand the other steps of the process 600, it would be helpful to examine the expression for the LLR in an optimum ML, as given by:

$$L_{i,b}^{det} = \log \frac{P(x_{i,b}=0 \mid \tilde{y}, R)}{P(x_{i,b}=1 \mid \tilde{y}, R)} \quad \text{(Eq. 11)}$$

$$\stackrel{\text{(Bayes)}}{=} \log \sum_{s \in X_{i,b}^0} p(\tilde{y} \mid s, R)P(s) - \log \sum_{s \in X_{i,b}^1} p(\tilde{y} \mid s, R)P(s)$$

$$\stackrel{\max}{\approx} -\log \underbrace{\min_{s \in x_{i,b}^1} \left\{\frac{1}{N_0}\|\tilde{y}-Rs\|^2 - \log P(s)\right\}}_{\triangleq d(s)} -$$

$$\min_{s \in x_{i,b}^0} \left\{\frac{1}{N_0}\|\tilde{y}-Rs\|^2 - \log P(s)\right\}$$

-continued $$L_{i,b}^{det} \overset{max-log}{\approx} \underbrace{\min_{s \in x_{i,b}^1} \left\{ \frac{1}{N_0} \|\tilde{y} - Rs\|^2 - \log P(s) \right\}}_{\triangleq d(s)} - \quad \text{(Eq. 12)}$$

$$\min_{s \in x_{i,b}^0} \left\{ \frac{1}{N_0} \|\tilde{y} - Rs\|^2 - \log P(s) \right\}$$

$$= \min_{s \in x_{i,b}^1} d(s) - \min_{s \in x_{i,b}^0} d(s)$$

$$= L_{i,b}^{(1)} - L_{i,b}^{(0)}$$

At operation block 616, for each candidate constellation point $s_2$ from stream $X_2$, a look up table is used to find a $M_{min}(s_2)$ metric, expressed as a function of $s_2$:

$$M_{min}(s_2) = \min_{s_1 \in X_1} \|(y_1/r_{11} - r_{12}s_2/r_{11}) - s_1\|^2 \quad \text{(Eq. 13)}$$

A preferred implementation of $M_{min}(s_2)$ computation amounts to doing equalization (the computation in the parentheses) followed by a small lookup table. At operation block 618, for each bit and value of the strong stream the LL including the $M_{min}$ metric is minimized over all scanned strong stream constellations as follows:

$$L_{2,b}^{(1)} = \min_{s_2 \in X_{2,b}^1} \frac{\|r_{11}\|^2}{N_0} (\|y_2/r_{11} - r_{22}/r_{11}s_2\|^2 + M_{min}(s_2)) \quad \text{(Eq. 14)}$$

$$L_{2,b}^{(0)} = \min_{s_2 \in X_{2,b}^0} \frac{\|r_{11}\|^2}{N_0} (\|y_2/r_{11} - r_{22}/r_{11}s_2\|^2 + M_{min}(s_2)) \quad \text{(Eq. 15)}$$

Note that each $s_2 \in S_2$ would contribute to minimization of $L_{2,b}^{(0)}$ and $L_{2,b}^{(1)}$ corresponding to a specific $s_2$ bit values, and the log(N) likelihood registers (L's) affected. It is possible that $s_2 \in S_2$ sweep may not reach some bit values (0 or 1) for some bit b, for this case the corresponding $L_{2,b}^{(0)}$ and $L_{2,b}^{(1)}$ are reset to some high value (i.e. low likelihood) before the loop starts. The LLR for each bit of the strong stream can be computed, at operation block 620, using the minimized LL expressions of Eqs. 14 and 15, from the following expression:

$$LLR_2 = L_{2,b}^{det(0)} = L_{2,b}^{(1)} - L_{2,b}^{(0)} \quad \text{(Eq. 16)}$$

Where, b=1, . . . , log(N), N being the QAM modulation order (constellation size.) The label det(0) denotes first iteration of the iML detector. Note that for reducing the computation complexity of the expressions of the Eqs. 14 and 15, the multiplication by $$\frac{\|r_{11}\|^2}{N_0}$$

can be moved to the expression in Eq. 16.

For the weak stream, the minimizations in the expressions of Eqs. 9 and 10 can be implemented, at operation block 622, by minimizing the weak stream ($s_1$) contribution terms $M_{1,b}^{(0)}(s_2)$, $M_{1,b}^{(1)}(s_2)$ given as a function of $s_2$:

$$M_{1,b}^{(1)}(s_2) = \min_{s_1 \in X_{1,b}^1} \|(y_1/r_{11} - r_{12}s_2/r_{11}) - s_1\|^2 \quad \text{(Eq. 17)}$$

$$M_{1,b}^{(0)}(s_2) = \min_{s_1 \in X_{1,b}^0} \|(y_1/r_{11} - r_{12}s_2/r_{11}) - s_1\|^2 \quad \text{(Eq. 18)}$$

The minimization of the weak stream contribution terms $M_{1,b}^{(0)}$, $M_{1,b}^{(1)}$ can be performed using equalization (the term in the parenthesis) followed by a small look-up table. At operation block 624, for each bit of the weak stream, minimize the LL including the minimized weak stream contribution terms $M_{1,b}^{(0)}(s_2)$, $M_{1,b}^{(1)}(s_2)$ over all scanned strong stream constellation points, as follows:

$$L_{1,b}^{(1)} = \min_{s_2 \in Scanned} \frac{\|r_{11}\|^2}{N_0} (\|y_2/r_{11} - r_{22}/r_{11}s_2\|^2 + M_{1,b}^{(1)}(s_2)) \quad \text{(Eq. 19)}$$

$$L_{1,b}^{(0)} = \min_{s_2 \in Scanned} \frac{\|r_{11}\|^2}{N_0} (\|y_2/r_{11} - r_{22}/r_{11}s_2\|^2 + M_{1,b}^{(0)}(s_2)) \quad \text{(Eq. 20)}$$

At operation block 626, the LLR for each bit of the weak stream can be computed using the minimized LL expressions of Eqs. 19 and 20 from the following expression:

$$LLR_1 = L_{1,b}^{det(0)} = L_{1,b}^{(1)} - L_{1,b}^{(0)} \quad \text{(Eq. 21)}$$

Note that for reducing the computation complexity of the expression of Eqs. 19 and 20, the multiplication by $$\frac{\|r_{11}\|^2}{N_0}$$

can be moved from Eqs. 19 and 20 to the expression in Eq. 21, as follows:

$$LLR_1 = L_{1,b}^{det} = \frac{\|r_{11}\|^2}{N_0} (L_{1,b}^{(1)} - L_{1,b}^{(0)}) \quad \text{(Eq. 22)}$$

The label "det(0)" denotes first iteration of the iML detector. For ML decoder no additional iterations are performed.

Figure 7:
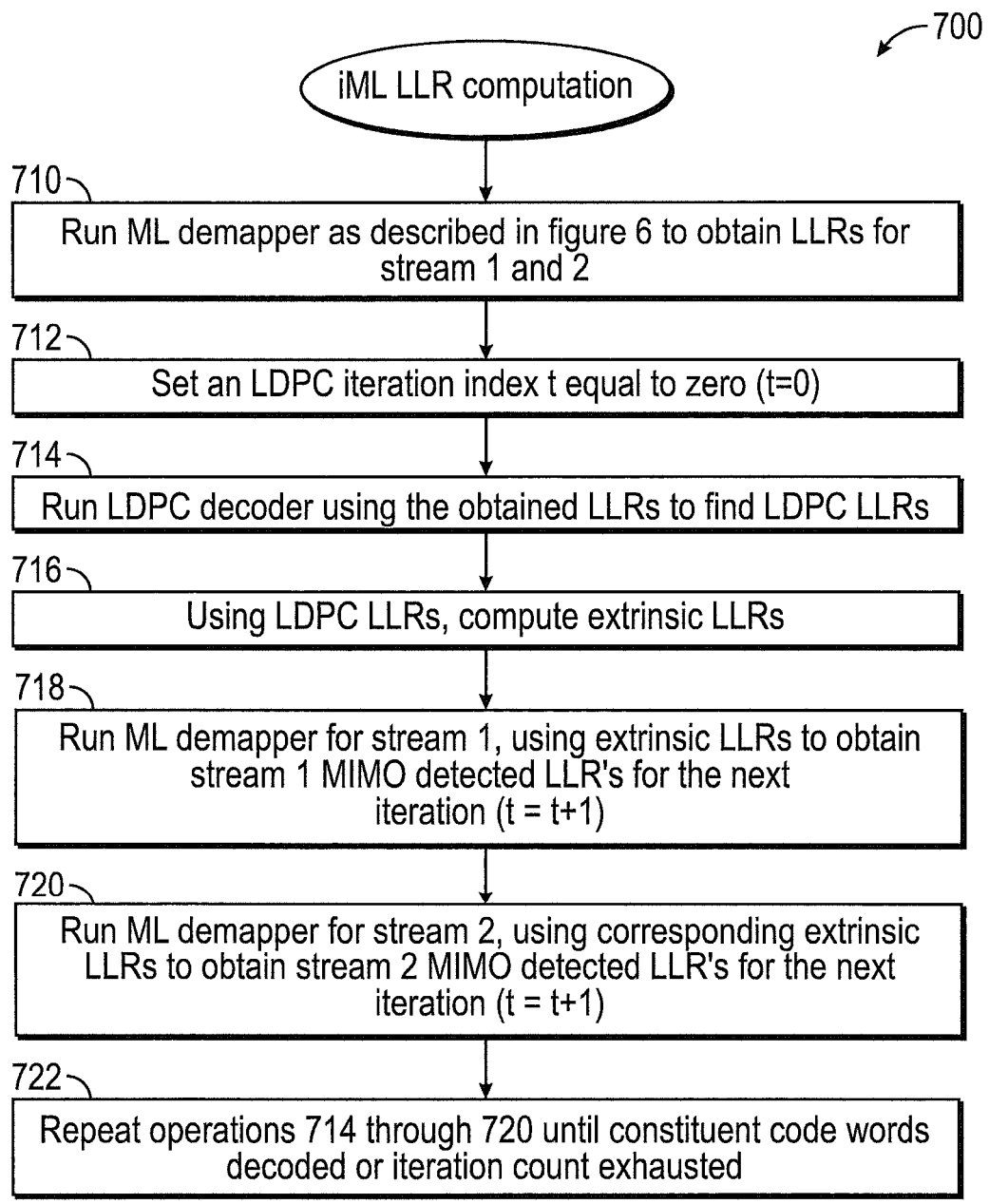
FIG. 7 is a flow diagram illustrating an example process for a maximum a posteriori iterative ML (iML) LLR computation, according to aspects of the subject technology.

FIG. 7 is a flow diagram illustrating an example process 700 for a maximum a posteriori iterative ML (iML) LLR computation, according to aspects of the subject technology. The iterative ML process starts at operation block 710, where the ML Demapper, as described above with respect to FIG. 6, is run to obtain LLR's for stream 1 and 2, denoted as $L_{1,b}^{det(0)}$ and $L_{2,b}^{det(0)}$ and expressed in Eqs. 21 and 22. The ML Demapper initially assumes uniform a priori probability of received bits. At the next operation block 712, the LDPC iteration index (t) is set to 0 (t=0). At operation block 714, the LDPC decoder is run by using $L_{1,b}^{det(0)}$ and $L_{2,b}^{det(0)}$ at its input—the per bit LLRs as generated by the ML demapperto obtain LDPC LLRs denoted as $L_{1,b}^{ldpc(t)}$ and $L_{2,b}^{ldpc(t)}$. At the next operation block 716, the extrinsic LLR's (the per bit difference between the LLR at the output of the LDPC to the counterpart LLR as fed at its input) are computed as follows:

$$L_{1,b}^{ext(t)} = L_{1,b}^{ldpc(t)} - L_{1,b}^{det(t)} \quad \text{(Eq. 23)}$$

$$L_{2,b}^{ext(t)} = L_{2,b}^{ldpc(t)} - L_{2,b}^{det(t)} \quad \text{(Eq. 24)}$$

This extrinsic LLRs reflect the per bit new information that was extracted by the FEC decoder from the relation between the different codeword bits. At operation block 718, the ML demapper is run for stream 1, using $L_{2,b}^{ext(t)}$ and $L_{2,b}^{ldpc(t)}$ to obtain stream 1 MIMO detected LLRs for the next iteration (t+1) denoted as $L_{1,b}^{det(t+1)}$. The intrinsic LLR's $L_{2,b}^{ldpc(t)}$ are used to generate the unconnected sphere scanned, while the extrinsic LLR's $L_{2,b}^{ext(t)}$ are used for ML demapping Eq (??). At operation block 720, the ML demapper is run for stream 2, using $L_{1,b}^{ext(t)}$ and $L_{1,b}^{ldpc(t)}$ to obtain stream 2 MIMO detected LLRs for iteration t+1 denoted as $L_{2,b}^{det(t+1)}$. The intrinsic (total output) LLR's $L_{1,b}^{ldpc(t)}$ are used to generate the unconnected sphere, while the extrinsic LLR's $L_{1,b}^{ext(t)}$ are used for ML demapping Eq (10). At operation block 722, operation blocks 714 through 720 are repeated until constituent code words decoded or iteration count exhausted. Because the operation blocks 718 and 720 above are symmetric, one can write a general expression for processing required for stream i (where i=1 or i=2), with the interfering stream denoted as i–3. As before, a triangular channel matrix R is used with dividing and multiplying by $r_{11}$. To obtain MIMO detector LLR's for stream i, for iteration t+1, we start from the following equations:

$$L_{1,b}^{(1)} = \min_{s_{3-i} \in X_{3-i}} \min_{s_i \in X_{i,b}^1} \frac{\|r_{11}\|^2}{N_0} \left\| y/r_{11} - \begin{bmatrix} 1 & r_{12}/r_{11} \\ 0 & r_{22}/r_{11} \end{bmatrix} \begin{bmatrix} s_i \\ s_{3-i} \end{bmatrix} \right\|^2 - \log P^{(t)}(s_i) - \log P^{(t)}(s_{3-i}) \quad \text{(Eq. 25)}$$

$$L_{1,b}^{(0)} = \min_{s_i \in X_{i,b}^0} \frac{\|r_{11}\|^2}{N_0} \left\| y/r_{11} - \begin{bmatrix} 1 & r_{12}/r_{11} \\ 0 & r_{22}/r_{11} \end{bmatrix} \begin{bmatrix} s_i \\ s_{3-i} \end{bmatrix} \right\|^2 - \log P^{(t)}(s_i) - \log P^{(t)}(s_{3-i}) \quad \text{(Eq. 26)}$$

where i=1 or 2—is the desired stream, for which the LLRs are computed, 3–i—is the other interfering stream that serves as interference to the first $s_i \in X_{i,b}^0$ and $s_{3-i} \in X_{3-i}$ are a constellation points of the desired and interfering streams, respectively, and where $s_i$ is a constraint to have bit value 0 on bit b of stream i. Further, $s_i \in X_{i,b}^1$ and $s_{3-i} \in X_{3-i}$ are constellation points of the desired and interfering streams correspondingly, where $s_i$ is a constraint to have bit value 1 on bit b of stream i, and log $P^{(t)}(s_i)$ and log $P^{(t)}(s_{3-i})$ are extrinsic probabilities of desired and interference streams constellation points conditioned on previous iterations 0 t (obtained by decoder).

Note that the matrix R for demodulating stream i=1 would be different than that used for demodulating stream i=2 (this corresponds to re-arranging the upper and lower triangular matrices). Further, when doing symbol mapping with Gray coding (e.g., as in 802.11 and many other standards), demodulating a stream i typically a negligible loss will occur if extrinsic information log $P^{(t)}(s_i)$ (In equations Eq. 25 and Eq. 26) of that desired stream are ignored, but to maintain iML gain extrinsic information of the interfering stream (as extracted from the FEC decoder) $ogP^{(t)}(s_{3-i})$ has to be accounted for.

This turns out very useful because, if an interfering constellation point $s_{3-i}$ is assigned/fixed, the above expressions (for given bit b on stream i) are minimized on the desired stream constellation points $s_i$ that minimize following simple $M_{i,b}^{(0)}$, $M_{i,b}^{(1)}$ metrics, as log $P(s_i)$ is ignored and other metric parts are not dependent on $s_i$. Moreover, $M_{i,b}^{(0)}$ and $M_{i,b}^{(1)}$ are the $s_i$ contributions to $L_{i,b}^{(0)}$ and $L_{i,b}^{(1)}$ as a function of $s_{3-i}$, $$\text{for } L_{i,b}^1 \text{ on } M_{i,b}^{(1)}(s_{3-i}) = \min_{s_i \in X_{i,b}^1} \|(y_1/r_{11} - r_{12}s_{3-i}/r_{11}) - s_i\|^2 \quad \text{(Eq. 27)}$$

$$\text{for } L_{i,b}^0 \text{ on } M_{i,b}^{(0)}(s_{3-i}) = \min_{s_i \in X_{i,b}^0} \|(y_1/r_{11} - r_{12}s_{3-i}/r_{11}) - s_i\|^2 \quad \text{(Eq. 28)}$$

The minimization of the desired stream contribution terms $M_{i,b}^{(0)}$ and $M_{i,b}^{(1)}$ can be performed using equalization (the term in the parentheses) followed by small 1-D look-up tables. Thus to compute $L_{i,b}^{det(t+1)}$ for stream i for iteration t+1 we use the following algorithm, including steps 1 through 4 below, which is used for operation blocks 718 and 720 of the iML implementation. We note that this 4-step processing flow is run twice (one pass with i=1 and a second pass with i=2).

1. To demodulate bits of desired stream i an "unconnected sphere" of probable points $s_{3-i}$ of the "interfering" stream 3–i (herein referred to as the interfering stream) is scanned. For each $s_{3-i}$, and for each bit b, best $M_{i,b}^{(0)}$ and $M_{i,b}^{(1)}$ metrics are found using lookup table based on Eq. 27 and Eq. 28. The so called "unconnected sphere" of probable points can be generated based on the intrinsic LLR's $L_{i,b}^{ldpc(t)}$ of the previous iteration (t), by flipping subsets of bits (b) having lowest abs ($L_{i,b}^{ldpc(t)}$). The higher the abs ($L_{i,b}^{ldpc(t)}$) is considered for the sphere, the sphere size is increased and similarly the complexity is increased, but at the same time the algorithm performance is somewhat improved. In practice, small unconnected spheres would be sufficient.

2. For the purpose of the algorithm, the term log $P(s_{3-i}|t_{-})$ can be expressed as:

$$\log P^{(t)}(s_{3-i}) \equiv \sum_{b=0}^{B-1} \left( \frac{1}{2} - \text{Bit}_b(s_{3-i}) \right) L_{i,b}^{ext(t)} \quad \text{(Eq. 29)}$$

Where B is the number of bits in stream $s_{3-i}$, and $\text{Bit}_b(s_{3-i})$ is the b's bit Boolean value of constellation point $s_{3-i}$. Note that while the definition used for log $P^{(t)}(s_{3-i})$ is not mathematically exact, it has a fixed offset (independent of all bits b selection) from the exact value. Since the fixed offset is independent of bit selection, it does not affect the minimization in the next step.

3. Next minimal $L_{i,b}^{(1)}$ and $L_{i,b}^{(0)}$ for each bit b is found, by applying equations Eq. 25 and Eq. 26, in which by substituting $M_{i,b}^{(0)}$ and $M_{i,b}^{(1)}$, the following expressions are obtained:

$$L_{i,b}^{(1,t+1)} = \min_{s_{3-i} \in X_{3-i}} \frac{\|r_{11}\|^2}{N_0} (\|y_2 - r_{22}/r_{11} s_{3-i}\|^2 + M_{i,b}^{(1)}) - \log P^{(t)}(s_{3-i}) \quad \text{(Eq. 30)}$$

$$L_{i,b}^{(0,t+1)} = \min_{s_{3-i} \in X_{3-i}} \frac{\|r_{11}\|^2}{N_0} (\|y_2 - r_{22}/r_{11} s_{3-i}\|^2 + M_{i,b}^{(0)}) - \log P^{(t)}(s_{3-i}) \quad \text{(Eq. 31)}$$

The is to say that L (minus Likelihood) values per bit b are to be minimized over all interference points $s_{3-i}$.

4. Finally the following expression is computed:

$$L_{i,b}^{det(t+1)} = L_{i,b}^{(1,t+1)} = L_{i,b}^{(1,t+1)} - L_{i,b}^{(0,t+1)} \quad \text{Eq. 32}$$

Note that for reducing the computation complexity the multiplication by $$\frac{\|r_{11}\|^2}{N_0}$$

in Eqs. 30 and 31 can be moved to the expression in EQ. 32. These LLRs $L_{i,b}^{det(t+1)}$ as derived by the iML demapper using FEC decoder extrinsic LLRs from iteration (t) are now fed to the LDPC for the next iteration (t+1).

Figure 8:
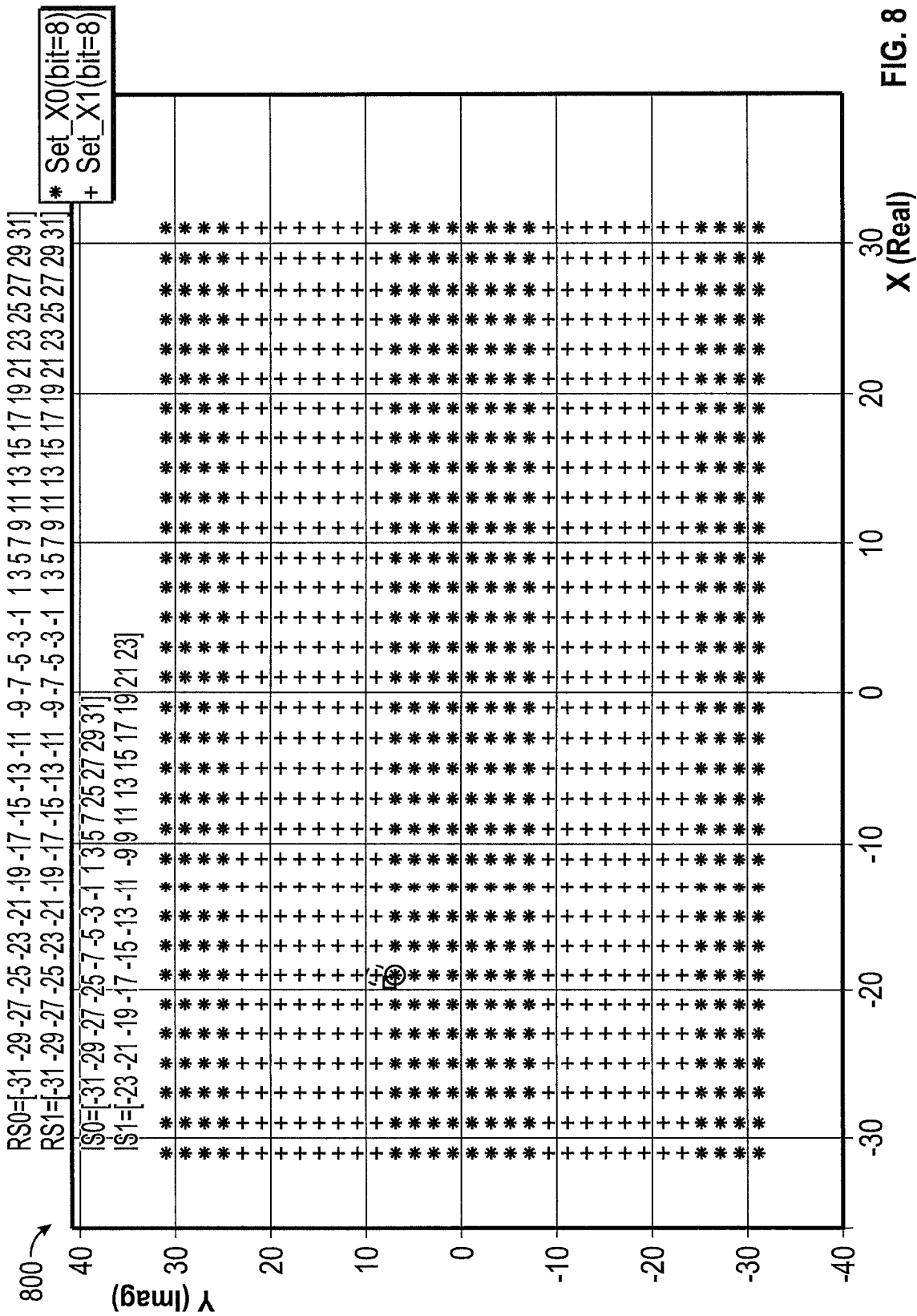
FIG. 8 is a chart illustrating an example signal set mapping, according to aspects of the subject technology.

FIG. 8 is a chart 800 illustrating an example signal set mapping, according to aspects of the subject technology. The chart 800 shows an example signal set mapping for a 1024-QAM signal set, with 1024 data points. The 10-bit constellation data of the 1024-QAM are mapped into 1024 symbols, of which only the $8^{th}$ bit (of 10 bits) from the most significant bit (MSB) is shown in the chart 800. It is understood that each of the 10-bit symbols corresponds to a valid complex value, where, its real or imaginary values range from −31 to +31 (e.g., 32 odd integer values). The X and Y axes of the chart 800, respectively, represent the real and imaginary values.

The example mapping shown in the chart 800 depicts separation, by the signal set mapping, of the 1024 symbols into two half sections. The points in the half section filled with asterisks (*) show the possible 1024/2=512 values when the 8th bit (out of 10 bits) is fixed to 0. Similarly, the points in the half section filled with plus sign (+) shows the set of points when the 8th bit is fixed to 1. According to the notation used in the chart 800, the bit position 0 is the MSB and the bit position 9 is the least significant bit (LSB). For each bit position 'b', a similar partition can be used when the LLR is computed. One important observation is that even though, any search of the reliability metric is over these two partitions, by splitting into real and imaginary sections, the structure can be explored with a reduced computational complexity.

The RS0 shown in the top of the chart 800 indicates the real values of the asterisks (*), and RS1 shows the range of real values that the plus sign (+) points can take. Clearly, in the particular case (b=8) of chart 800, the values can run through all 32 points (−31 to 31). However, the imaginary values shown by IS0 and IS1 do not overlap. The IS0 represents the imaginary values of the asterisks (*), and IS1 represents the imaginary values of the plus sign (+) points. As noted above, the chart 800 is only for the $8^{th}$ bit, the corresponding charts for other bits of the 10-bit symbols of the 1024-QAM may have different partitions that the chart 800 and are not shown for brevity.

Figure 9:
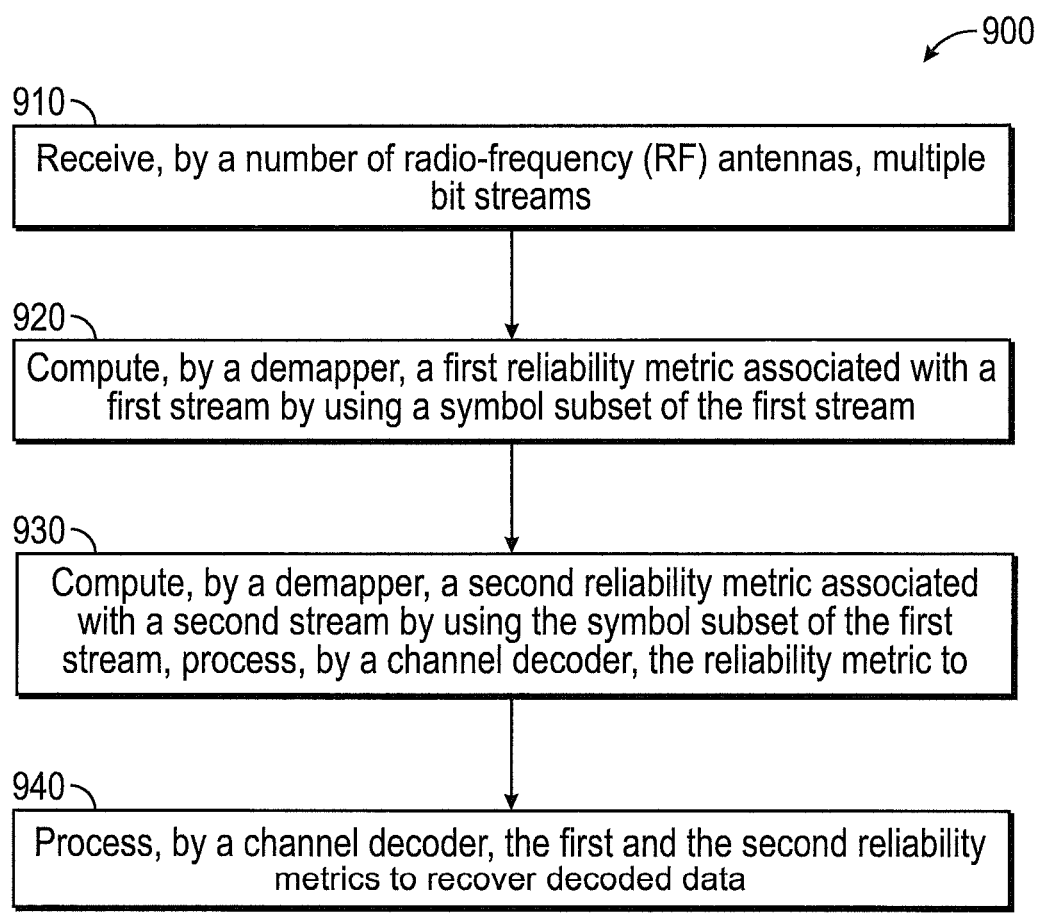
FIG. 9 is a flow diagram illustrating an example method for a reduced complexity ML LLR computation, according to aspects of the subject technology.

FIG. 9 is a flow diagram illustrating an example method 900 for a reduced complexity ML LLR computation, according to aspects of the subject technology. The method 900 includes receiving, by a number of radio-frequency (RF) antennas (e.g., 122 of FIG. 1A) multiple bit streams (e.g., y [k] of FIG. 2) (910). The method 900 further includes computing, by a demapper (e.g., 130 of FIG. 1B), a first reliability metric (e.g., LLR1) associated with a first stream by using a symbol subset of the first stream (e.g., using the algorithm of FIG. 6) (920). The demapper can compute a second reliability metric associated with a second stream by using the symbol subset of the first stream (e.g., using the algorithm of FIG. 7) (930). A channel decoder (e.g., 140 of FIG. 1B) processes the first and the second reliability metrics to recover decoded data (e.g., $\hat{b}$ of FIG. 1B) (940).

Figure 10:
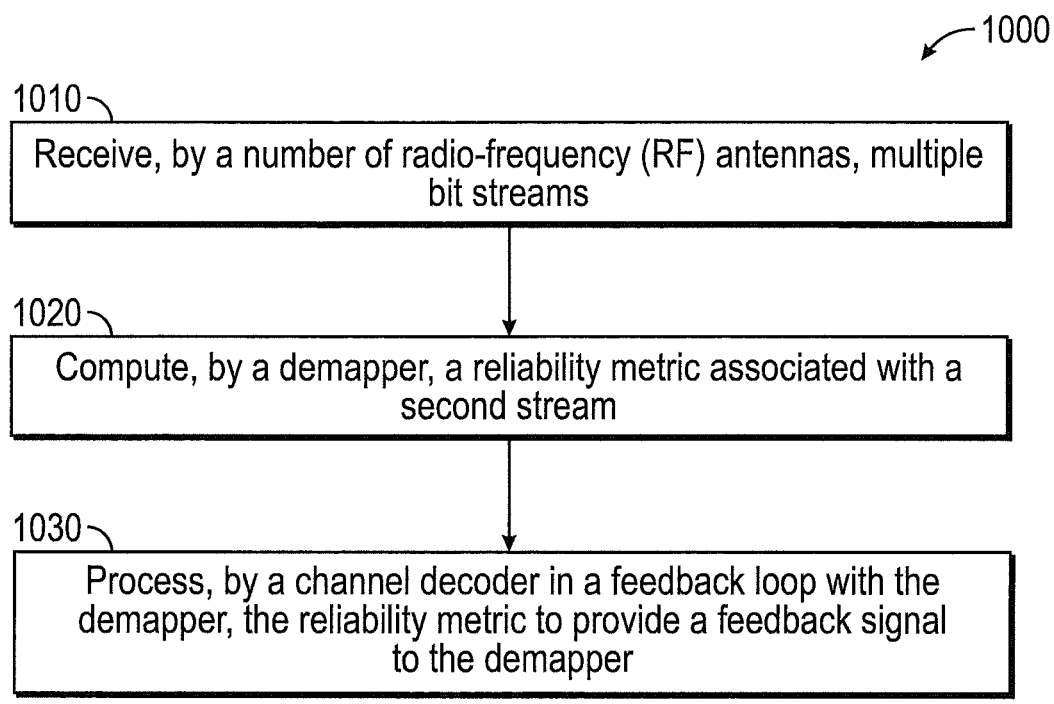
FIG. 10 is a flow diagram illustrating an example method for a maximum a posteriori iML LLR computation, according to aspects of the subject technology.

FIG. 10 is a flow diagram illustrating an example method 1000 for an iML LLR computation, according to aspects of the subject technology. The method 1000 includes receiving, by a number of radio-frequency (RF) antennas (e.g., 122 of FIG. 1A), multiple bit streams (e.g., y [k] of FIG. 2) (1010). The method 1000 further includes computing, by a demapper (e.g., 130 of FIG. 1B), a reliability metric (e.g. LLR2) associated with a second stream (e.g., using the algorithm of FIG. 7) (1020), and processing, by a channel decoder (e.g., 140 of FIG. 1B), in a feedback loop with the demapper, the reliability metric to provide a feedback signal (e.g., 142 of FIG. 1B) to the demapper (1030). The demapper is a posteriori iterative demapper, and computing the reliability metric (e.g., using the algorithm of FIG. 7) comprises using a symbol subset (e.g., 320 of FIG. 3B) of at least a first stream and the feedback signal to compute the reliability metric for a second stream with a reduced complexity.

Figure 11:
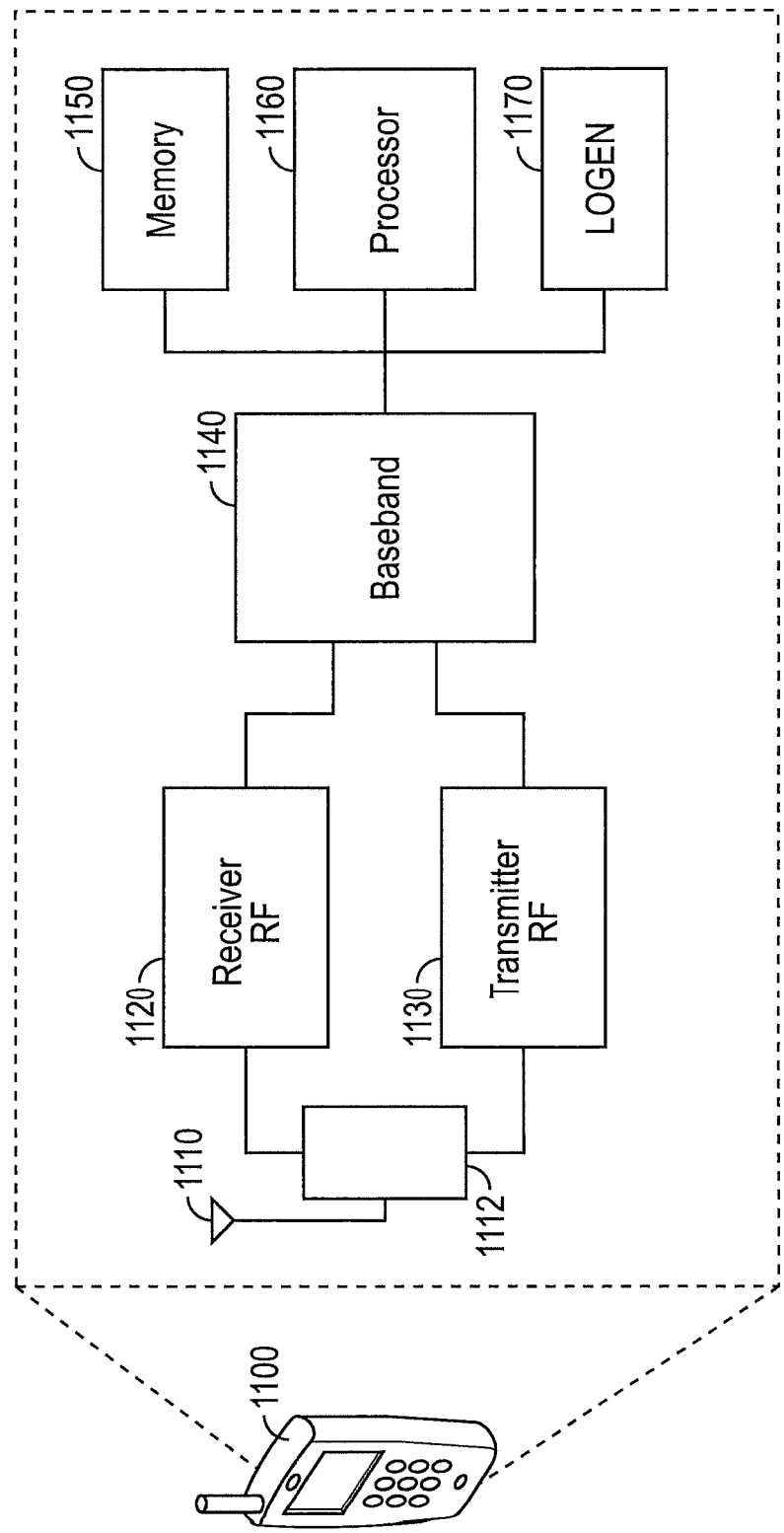
FIG. 11 is a block diagram illustrating an example of a wireless communication device using aspects of the subject technology.

FIG. 11 is a block diagram illustrating an example of a wireless communication device using aspects of the subject technology. The wireless communication device 1100 may comprise a radio-frequency (RF) antenna 1110, a receiver 1120, a transmitter 1130, a baseband processing module 1140, a memory 1150, a processor 1160, and a local oscillator generator (LOGEN) 1170. In various embodiments of the subject technology, one or more of the blocks represented in FIG. 11 may be integrated on one or more semiconductor substrates. For example, the blocks 1120-1170 may be realized in a single chip or a single system on a chip, or may be realized in a multi-chip chipset.

The receiver 1120 may comprise suitable logic circuitry and/or code that may be operable to receive and process signals from the RF antenna 1110. The RF antennas may represent antennas 112 and 122 of FIG. 1A. The receiver 1120 may, for example, be operable to amplify and/or down-convert received wireless signals. In various embodiments of the subject technology, the receiver 1120 may be operable to cancel noise in received signals and may be linear over a wide range of frequencies. In this manner, the receiver 1120 may be suitable for receiving signals in accordance with a variety of wireless standards, Wi-Fi, WiMAX, Bluetooth, and various cellular standards. In various embodiments of the subject technology, the receiver 1120 may not require any SAW filters and few or no off-chip discrete components such as large capacitors and inductors.

The transmitter 1130 may comprise suitable logic circuitry and/or code that may be operable to process and transmit signals from the RF antenna 1110. The transmitter 1130 may, for example, be operable to up-convert baseband signals to RF signals and amplify RF signals. In various embodiments of the subject technology, the transmitter 1130 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 1130 may be operable to provide signals for further amplification by one or more power amplifiers. In some implementations, the receiver 1120 may implement the demapper and decoder of the subject technology (e.g., 130 and 140 of FIG. 1B) to reduce computational complexity.

The duplexer 1112 may provide isolation in the transmit band to avoid saturation of the receiver 1120 or damaging parts of the receiver 1120, and to relax one or more design requirements of the receiver 1120. Furthermore, the duplexer 1112 may attenuate the noise in the receive band. The duplexer may be operable in multiple frequency bands of various wireless standards.

The baseband processing module 1140 may comprise suitable logic, circuitry, interfaces, and/or code that may be operable to perform processing of baseband signals. The baseband processing module 1140 may, for example, analyze received signals and generate control and/or feedback signals for configuring various components of the wireless communication device 1100, such as the receiver 1120. The baseband processing module 1140 may be operable to encode, decode, transcode, modulate, demodulate, encrypt, decrypt, scramble, descramble, and/or otherwise process data in accordance with one or more wireless standards. In some embodiments, the baseband processing module 1140 may perform the functionalities of the baseband processor 260 of FIG. 2. As described above.

The processor 1160 may comprise suitable logic, circuitry, and/or code that may enable processing data and/or controlling operation blocks of the wireless communication device 1100. In this regard, the processor 1160 may be enabled to provide control signals to various other portions of the wireless communication device 1100. The processor 1160 may also control transfers of data between various portions of the wireless communication device 1100. Additionally, the processor 1160 may enable implementation of an operating system or otherwise execute code to manage operation blocks of the wireless communication device 1100.

The memory 1150 may comprise suitable logic, circuitry, and/or code that may enable storage of various types of information such as received data, generated data, code, and/or configuration information. The memory 1150 may comprise, for example, RAM, ROM, flash, and/or magnetic storage. In various embodiment of the subject technology, information stored in the memory 1150 may be utilized for configuring the receiver 1120 and/or the baseband processing module 1140. The memory 1150 may include the RAM 272 and the ROM 274 of FIG. 2 and may store tables 1100A and 1100B of the subject disclosure.

The local oscillator generator (LOGEN) 1170 may comprise suitable logic, circuitry, interfaces, and/or code that may be operable to generate one or more oscillating signals of one or more frequencies. The LOGEN 1170 may be operable to generate digital and/or analog signals. In this manner, the LOGEN 1170 may be operable to generate one or more clock signals and/or sinusoidal signals. Characteristics of the oscillating signals such as the frequency and duty cycle may be determined based on one or more control signals from, for example, the processor 1160 and/or the baseband processing module 1140.

In operation block, the processor 1160 may configure the various components of the wireless communication device 1100 based on a wireless standard according to which it is desired to receive signals. Wireless signals may be received via the RF antenna 1110 and amplified and down-converted by the receiver 1120. The baseband processing module 1140 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 1150, and/or information affecting and/or enabling operation block of the wireless communication device 1100. The baseband processing module 1140 may modulate, encode and perform other processing on audio, video, and/or control signals to be transmitted by the transmitter 1130 in accordance with various wireless standards.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus comprising:
   a demapper configured to compute a reliability metric associated with a plurality of bit streams received by a plurality of radio-frequency (RF) antennas; and
   a channel decoder in a feedback loop with the demapper and configured to process the reliability metric to provide a feedback signal to the demapper, wherein the demapper is an iterative demapper and is configured to use a symbol subset of at least a first stream of the plurality of bit streams and the feedback signal to compute the reliability metric for a second stream of the plurality of bit streams.

2. The apparatus of claim 1, wherein the plurality of bit streams comprises two bit streams, and wherein the demapper is configured to support quadrature amplitude modulation (QAM) constellations up to a constellation size N of 4096.

3. The apparatus of claim 2, wherein the symbol subset comprises a subset of a full QAM constellation grid where a solution has a highest likelihood, wherein the symbol subset comprises a spherical or a rectangular space, and wherein the spherical space is represented by a center point coordinate and a radius determined based on observation.

4. The apparatus of claim 3, wherein the two bit streams comprise an interfering stream and a desired stream, wherein an association of the first and second streams to the interfering and the desired streams, respectively, is used in a first pass of a two-pass processing flow and is changed in a second pass of the two-pass processing flow, and wherein the demapper is configured to store bits of real and imaginary portions of symbols of each of desired and interfering streams in separate independent lookup tables.

5. The apparatus of claim 4, wherein the feedback signal for each iteration is derived from a previous iteration, wherein the feedback signal includes extrinsic bit probabilities associated with the interfering stream.

6. The apparatus of claim 4, wherein the demapper is configured to setup lookup tables for bits of symbols of the desired stream simultaneously.

7. The apparatus of claim 6, wherein the demapper is configured to reduce an order of computation complexity of determining a log likelihood ratio (LLR) to a level of $2*N*\log(N)$, wherein N is a QAM modulation order.

8. The apparatus of claim 7, the demapper is configured to determine the LLR based on register values and first a priori bit probabilities associated with the interfering stream received from the channel decoder, and to omit second a priori bit probabilities associated with the desired stream to reduce a computation complexity.

9. The apparatus of claim 8, wherein the register values include minimum bit log likelihood values and are updated based on corresponding values from the lookup tables, a predetermined bias value and a Gmin value, wherein the Gmin value is a measure of a distance covering a geometry of the subset.

10. The apparatus of claim 9, wherein the demapper is configured to determine an LLR for each bit of a symbol of a stream by subtracting a first register value associated with the bit being a 1 from a second register value associated with the bit being a 0 and multiplying a subtraction result by a normalization factor.

11. The apparatus of claim 9, wherein the demapper is configured to scale a triangular decomposition matrix in a way that one of a main diagonal term is a real constant and another main diagonal term is a real parameter.

12. A method of demapping with reduced computational complexity, the method comprising:
receiving, by a plurality of radio-frequency (RF) antennas, a plurality of bit streams;
computing, by a demapper, a reliability metric associated with a second stream of the plurality of bit streams; and
processing, by a channel decoder in a feedback loop with the demapper, the reliability metric to provide a feedback signal to the demapper, wherein the demapper is an iterative demapper, and computing the reliability metric comprises using a symbol subset of at least a first stream of the plurality of bit streams and the feedback signal to compute the reliability metric for a second stream of the plurality of bit streams with a reduced complexity.

13. The method of claim 12, wherein the symbol subset comprises a subset of a full QAM constellation grid where a solution is most likely, wherein the subset comprises a spherical or a rectangular space, and wherein a subset dimension is less than a number of streams, wherein the full QAM constellation grid includes up to 4096 grid points.

14. The method of claim 13, wherein the plurality of bit streams comprises two bit streams including an interfering stream and a desired stream representing a desired stream, wherein demapping further comprises storing bits of real and imaginary portions of symbols of each of the interfering stream and the desired stream in separate independent lookup tables.

15. The method of claim 14, wherein providing the feedback signal comprises deriving the feedback signal for each iteration from processing a previous reliability metric in a previous iteration, wherein the feedback signal includes a priori bit probabilities associated with the interfering stream, and wherein demapping further comprises setting up the lookup tables for bits of symbols of the desired stream simultaneously.

16. The method of claim 14, wherein computing the reliability metric comprises computing a log likelihood ratio (LLR) for a bit of the second stream, and wherein the LLR is a log of a ratio of a first probability of the bit being a 0 (P0) to a second probability of the bit being a 1 (P1), and wherein demapping reduces a computation complexity of determining the LLR to a level of $2*N*\log(N)$, wherein N is a QAM modulation order.

17. The method of claim 16, wherein demapping comprises determining the LLR based on register values and first a priori bit probabilities associated with the interfering stream received from the channel decoder, and by omitting second a priori bit probabilities associated with the desired stream to reduce a computation complexity, and wherein the register values include minimum bit log likelihood values and are updated based on corresponding values from the lookup tables, a predetermined bias value and a Gmin value, wherein the Gmin value is a measure of a distance covering a geometry of the subset.

18. The method of claim 17, wherein the register values include minimum bit log likelihood values and are updated based on corresponding values from the lookup tables, a predetermined bias value and a Gmin value, wherein the Gmin value is a measure of a distance covering a geometry of the subset.

19. The method of claim 18, wherein demapping further comprises:
scaling a triangular decomposition matrix in a way that one of a main diagonal term is a real constant and another main diagonal term is a real parameter to reduce computational complexity, and
determining an LLR for each bit of a symbol of a stream by subtracting a first register value associated with the bit being a 1 from a second register value associated with the bit being a 0 and multiplying a subtraction result by a normalization factor.

20. A wireless communication device comprising:
multiple antennas configured to receive a plurality of bit streams; and a baseband processor comprising a demapper configured to compute a reliability metric, and a channel decoder, wherein:

the channel decoder is in a feedback loop with the demapper and is configured to process the reliability metric to provide a feedback signal to the demapper, and the demapper is configured to compute, in a next iteration, a new reliability metric associated with a second stream of the plurality of bit streams by using a symbol subset of at least a first stream of the plurality of bit streams and the feedback signal, and the demapper is configured to compute a new reliability matrix with a reduced complexity.

* * * * *